United States Patent [19]

Hirasawa et al.

[11] 4,346,471
[45] Aug. 24, 1982

[54] OPTICAL APPARATUS FOR TRACKING A RECORD CARRIER

[75] Inventors: Kazuo Hirasawa; Takahiro Kubo, both of Amagasaki, Japan

[73] Assignee: Mitsubishi Denki Kabushiki Kaisha, Tokyo, Japan

[21] Appl. No.: 156,227

[22] Filed: Jun. 4, 1980

[30] Foreign Application Priority Data

Jun. 4, 1979 [JP] Japan ................................. 54-70888

[51] Int. Cl.³ .......................... G11B 7/00; H04N 5/76
[52] U.S. Cl. ...................................... 369/44; 369/102; 360/77; 250/202; 358/128.5
[58] Field of Search .................. 369/43, 44, 122, 102, 369/124; 360/77; 250/202; 358/128.5, 128.6

[56] References Cited

U.S. PATENT DOCUMENTS 4,051,528 9/1977 Takeda ............................. 358/128.5

*Primary Examiner*—John H. Wolff
*Assistant Examiner*—Alan Faber
*Attorney, Agent, or Firm*—Sughrue, Mion, Zinn, Macpeak and Seas

[57] ABSTRACT

An apparatus for tracking, by means of radiating beams of light, a record disc (6) which contains video or audio signals recorded in optical form. First and second lasers (1a, 1b) generate a first beam for reading out recorded information, and a second beam for tracking, respectively. The first beam provides a first optical spot (8a) on an information track (7) and the second beam provides a second optical spot (8b) in close proximity to the first spot. The first and second beams are selected alternately. The reflected second beam is detected by a radiation-sensitive detector (20) and compared with a reference signal level. The position of the optical system (200), including the first and second lasers, is physically adjusted by shifting means (14) in response to amplitude differences between the detected signal caused by the second beam and the reference signal level to implement accurate tracking control in spite of spindle hole eccentricities or the like.

7 Claims, 14 Drawing Figures

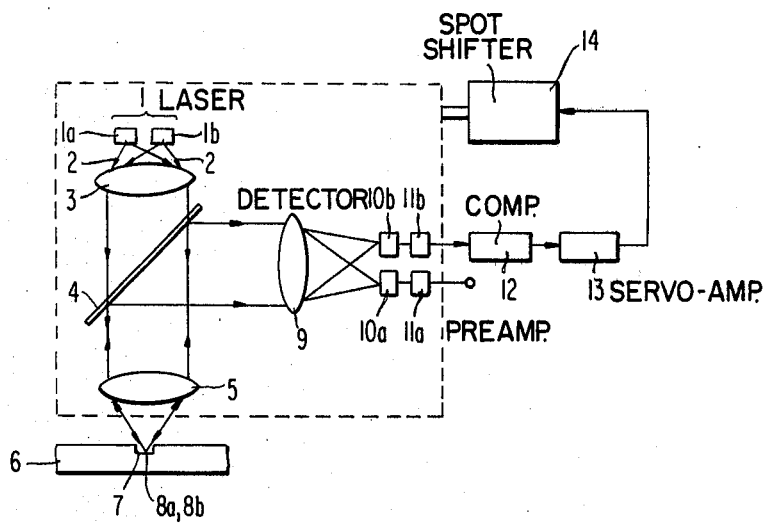
FIG 1 PRIOR ART
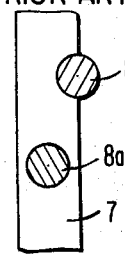
FIG 2 (a) PRIOR ART
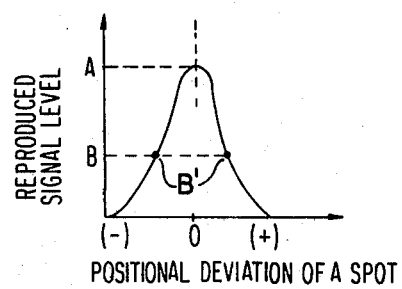
FIG 2 (b) PRIOR ART
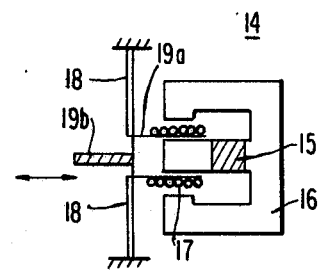
FIG 3 PRIOR ART
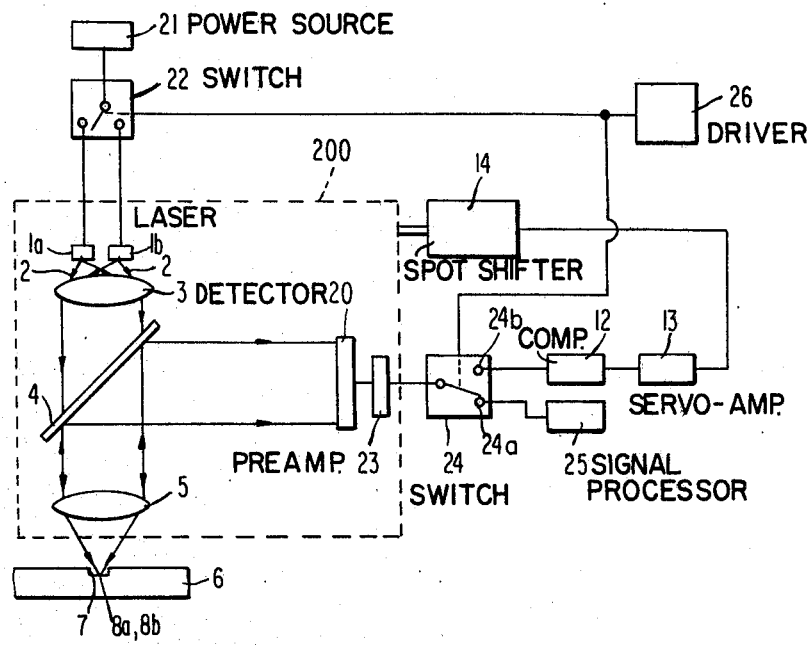
FIG 4

OPTICAL APPARATUS FOR TRACKING A RECORD CARRIER

BACKGROUND OF THE INVENTION

1. Field of the Invention

This invention relates to an optical apparatus for tracking a record carrier and reading out prerecorded information therefrom, such as video and/or audio signals, and more particularly to an optical apparatus comprising an improved means of tracking control.

2. Description of the Prior Art

Optical video disc players are well known in the prior art, as for example the Philips-MCA system, and Pulse Code Modulation (PCM) systems in which audio signals are reproduced are also well known.

The disc player is generally provided with a radiation source such as a semiconductor laser for projecting a light beam onto a record carrier, such as a record disc, an object lens for focusing the light beam on the disc, drive means for causing relative motion between the light beam and the disc in order to optically scan the surface of the disc and read out means for reproducing the information signal in accordance with the intensity of the beam reflected from the disc.

More specifically, the disc player is typically constructed in such a way that the record disc is spirally scanned with the light beam slowly moving along a radius of the rotating disc to read out the information signal in accordance with the intensity of the reflected beam, which varies with the presence of information pits.

Generally speaking, the record discs on which the tracks are encoded spirally or concentrically are necessarily subjected to the effects of eccentricity or an out-of-roundness of the tracks induced by mechanical inaccuracy. In order to correctly follow these minute tracks (hereinafter referred to as "tracking") at the time of reproduction, it is known to provide two light spots, one for reading out the signals, and the other for tracking. To facilitate an understanding of this invention, a detailed description of the prior art is presented below.

A conventional optical reproducing system is shown in FIGS. 1 through 3. In FIG. 1, a radiation source 1 consists of two semiconductor lasers 1a, 1b whose radiation sources are in the same plane. The laser beams 2,2 radiated from the source 1 are respectively collimated by a first lens 3. The collimated beams pass through a half mirror 4, and are focused by a second lens 5 onto the surface of a disc 6 on which a track 7 is formed.

As shown in FIG. 2, the beams focused on the track 7 form two spots 8a, 8b; the spot 8a is used for the readout of signals, and the spot 8b for the tracking of the track 7. The laser beams 2,2 reflected by the track 7 are again collimated by the lens 5. The collimated beams are reflected by the half mirror 4 and are again focused via a third lens 9 onto radiation sensitive detectors 10a, 10b.

More specifically, the reflected beam from the spot 8a is fed to the detector 10a which converts the optical signals, which vary in intensity in accordance with the presence of the pits on the track 7, into electric signals. The output from the detector 10a is fed to a demodulating circuit (not shown) via a preamplifier 11a. The reflected beam from the spot 8b is fed to a detector 10b that is connected to a tracking control circuit.

FIG. 2 (a) shows the relative position of the spots 8a and 8b on the track 7. The diameter of each spot is about 2 μm, and the distance between them is several tens of μm, although such spacing is shortened in the drawing for simplicity of illustration. The relative position of the spots 8a, 8b is always maintained constant.

FIG. 2 (b) shows a characteristic curve representing the variation of the reproduced signal level corresponding to the relative positional deviation between the center of the track and the center of the spot. The x axis represents the amount of deviation of the spot center with respect to the track center, and the y axis represents the output level of the reproduced signal. Accordingly, when the spot 8b is positioned at either of points B' on the curve, the output level of the detector 10b is represented by B. At this time, because the spot 8a is positioned at the center of the track, the output level of the detector 10a reaches the maximum point A.

If the position of spot 8a shifts in either the plus direction or the minus direction, the output level of the detector 10a will decrease in accordance with the curve illustrated in FIG. 2 (b). However, because the position of spot 8b is also moved in accordance with the shifting of spot 8a, the output of detector 10b will change in inverse proportion to the polarity of the shifting direction of spot 8b as seen from the Figure, the changing rate of the output level being determined by the inclination of the curve at point B'.

Referring back to FIG. 1, the output of the detector 10b, containing the track shifting information due to the deviation from the reference position B' of spot 8b, is fed to a spot shifting device 14 by way of a preamplifier 11b, a comparator 12 and a servo-amplifier 13. As a result, the spot shifting device 14 is operable to move spots 8a, 8b back into the predetermined position, thus following the relative lateral shifts of the track.

FIG. 3 shows an embodiment of the spot shifting device 14, which is similar to the voice coil of a loudspeaker in its construction. The device 14 comprises a permanent magnet pole 15, a core 16, a coil 17, springs 18, a bobbin 19a and a connecting bar 19b. The coil 17 is wound on the exterior of the bobbin 19a, which is supported by springs 18, 18 whose ends are connected to a fixed support. In accordance with the magnitude of the current flowing in the coil 17, the magnitude and direction of movement of the coil 17 is determined. Thus, the connecting bar 19b is moved as shown by the arrow. The connecting bar is fixed to the optical system, and thus functions to move the spots 8a, 8b back into their optimum predetermined positions.

This prior art tracking control device has a disadvantage in that the structure and control of the optical system becomes complicated since an additional lens 9 and two radiation-sensitive detectors 10a, 10b are needed in order to separate the reflected beams. Consequently, it is very difficult to accurately focus the reflected beams on the radiation-sensitive detectors 10a, 10b since the diameter of the focused spots is only several μm and the distance between them is several tens of μm.

SUMMARY OF THE INVENTION

This invention provides an improved tracking control apparatus which operates with only a single radiation-sensitive detector, thereby eliminating the problem of the accurate positional adjustment of separate radiation detectors, and the provision of an additional lens for focusing radiation beams onto the detectors.

This invention accomplishes these objectives by the provision of a first radiation source for generating a first beam applied to the information track of the record carrier to read out information. A second radiation source generates a second or tracking beam spaced a predetermined distance from the first beam, and a first selector is operable to select one of the first and second beams to be applied to the record carrier. A radiation detector is operable to detect a beam reflected from said record carrier, and a second selector is coupled with the detector and operates in synchronism with said first selector to thus alternately switch the system between the read out and tracking beams. A shifting device is coupled with the second selector to adjust the position of the optical system in response to an amplitude difference between the tracking output of the second selector and a reference signal level, in order to accurately follow the information track.

BRIEF DESCRIPTION OF THE DRAWINGS

This invention will be more easily understood from the following detailed description taken in conjunction with the accompanying drawings in which:

FIG. 1 is a block diagram of an example of a reproducing apparatus of the prior art;

FIG. 2 (a) depicts the positional relation between two light spots on the information track of the record carrier;

FIG. 2 (b) is a characteristic curve of the reproduced signal level in response to a deviation of a light spot from the center of the information track;

FIG. 3 is a sectional view of a shifting means for repositioning the light spots;

FIG. 4 is a block diagram of an embodiment according to the present invention;

FIGS. 5A through 7B illustrate sampling methods applicable to the present invention for sampling a recorded signal.

DETAILED DESCRIPTION OF THE PREFERRED EMBODIMENT

Figure 5:
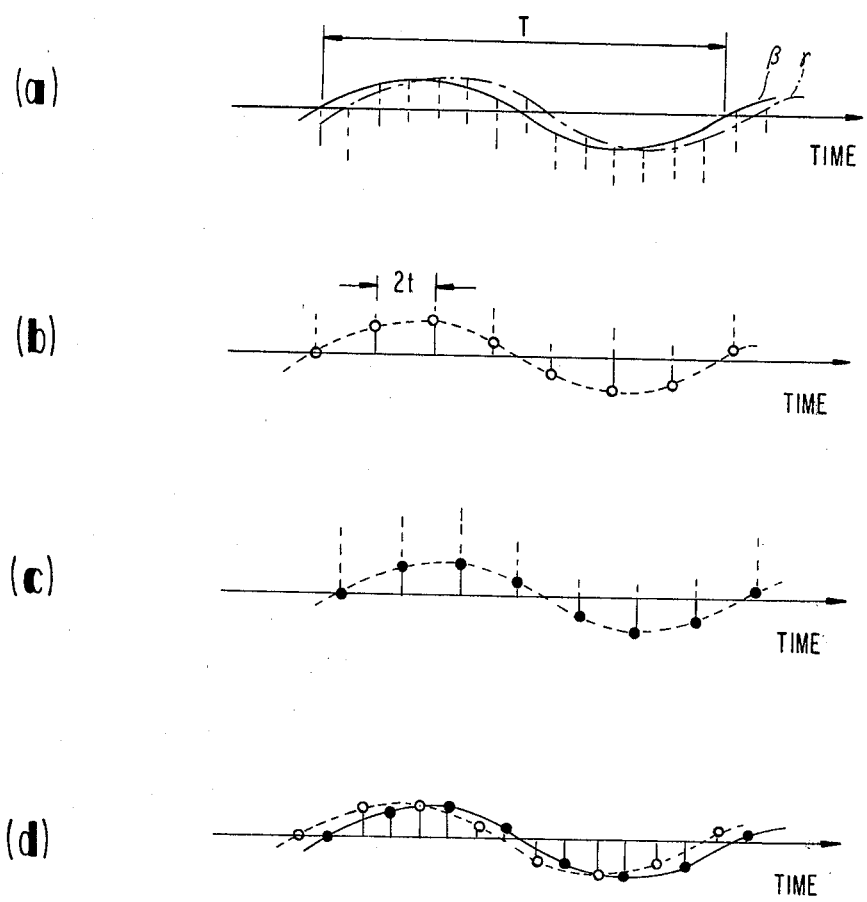

FIG. 4 is a block diagram of an embodiment of this invention, wherein like reference numerals designate components identical to those shown in FIG. 1. In FIG. 4, laser beams 2,2 radiated from each semiconductor laser 1a, 1b are focused on a disc 6, and the reflected beams from the disc impinge on a radiation-sensitive detector 20 which is similar to that shown in FIG. 1. However, only one such detector is used in this invention.

Digressing for a moment, FIG. 5 illustrates the waveforms produced by a sampling type of signal transmission system. The pulse waveform shown in FIG. 5 (b) is produced by sampling waveform β having a period T as shown in FIG. 5 (a) at every 2nt time interval, where n is an integer with T>4t, and the pulse waveform of FIG. 5 (c) is produced by sampling the waveform γ of FIG. 5 (a) at every (2n+1)t time interval. The pulse waveform shown in FIG. 5 (d) is obtained by combining the waveforms shown in FIGS. 5 (b) and (c). The original pulse waveform shown in FIG. 5 (b) can be subsequently recovered through demodulation by removing pulses from the waveform shown in FIG. 5 (d) at every 2nt time interval. That is, it can be obtained by combing out the pulses (illustrated as a train of circles) shown in FIG. 5 (b) from the waveform shown in FIG. 5 (d). The original pulse waveform shown in FIG. 5 (c) can also be recovered in the same manner. From these recovered pulse trains both of the original signal waveforms β and γ before sampling can be reproduced by conventional techniques. Such time sharing thus makes it possible to transmit two different signals in a combined or multiplexed manner.

Returning now to FIG. 4, an output of a power source 21 for the lasers is fed to a first switch 22 which selectively activates the lasers 1a or 1b to thus produce a waveform for reproducing the recorded signal, as shown in FIG. 5 (b), and a waveform for tracking control, as shown in FIG. 5 (c). A signal derived from a beam reflected from the disc 6 and sensed by the detector 20 is fed through a preamplifier 23 to a second switch 24. While the laser 1a is activated, the second switch 24 selects contact 24a and transmits the output of the preamplifier 23 to a signal processing circuit 25. The information recorded on the information track 7 is reproduced through demodulation in the signal processing circuit 25 in a conventional manner.

On the other hand, while the semiconductor laser 1b is activated, the second switch 24 selects a contact 24b and feeds the output of the preamplifier 23 to a comparator 12 and a servo-amplifier 13. The first and second switches 22, 24 are synchronously controlled by a common driver circuit 26. The comparator 12 detects the level of the reproduced signal and compares it with the reference voltage B shown in FIG. 2 (b). The output of the servo-amplifier 13 drives the spot shifting device 14, thereby moving the optical system 200 (surrounded by a dotted line in FIG. 4) to positionally adjust the spots 8a, 8b and thus implement precise and accurate tracking control.

Figure 6:
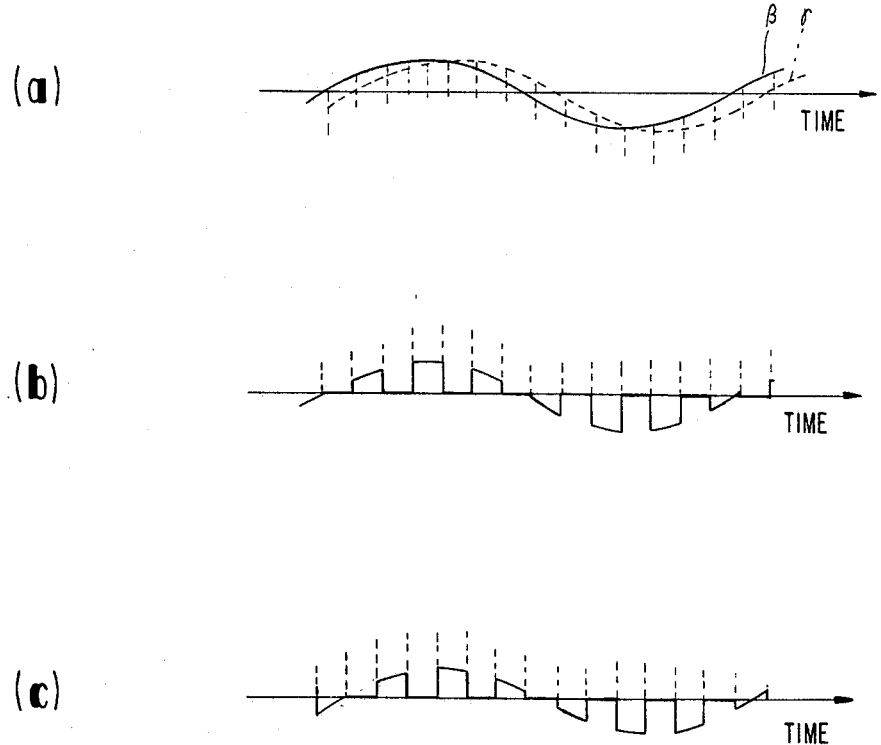
Figure 7:
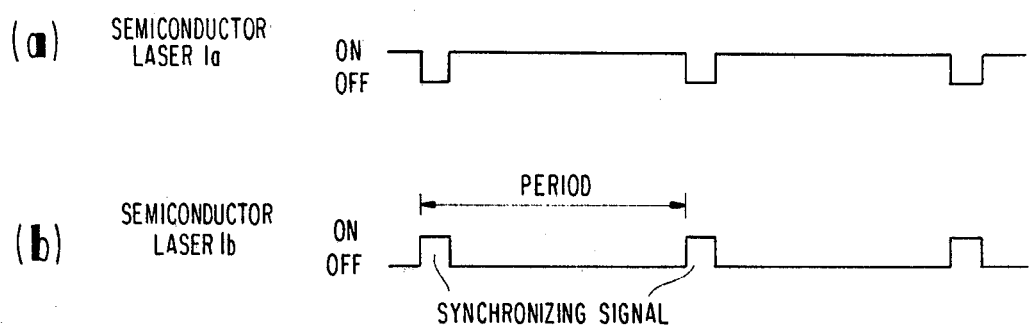

As possible alternatives, the manner of activating the lasers 1a, 1b can differ from that described above in at least two ways. The first method is one in which the lasers are alternately switched to equally complement each other as shown in FIG. 6. The other method varies the operating interval of the laser 1a from that of laser 1b as shown in FIG. 7.

The latter method is suitable where the frequency band for tracking control is much smaller than the frequency band of the sampling signal for read out or reproduction. More specifically, a sampling frequency twice that of the transmission signal is basically required (the Nyquist frequency), although a sampling frequency ten times as high as that of the transmission signal is desired in practice.

In reproducing a video signal recorded on a disc, the frequency band of the transmission signal is several MHz whereas the necessary frequency for accurate tracking control is several KHz. In this case, it is clearly not necessary for the tracking control laser 1b to be activated at a speed of ten times the frequency of the reproduced signal; it is more than sufficient to activate the laser 1b at a frequency of several tens of KHz, for example, at the frequency of the horizontal synchronizing signal of the recorded video signal. Because the operating interval, i.e., the conducting frequency, of the laser 1a for reading out the recorded signal does not have to be equal to the operating interval of the laser 1b for tracking control, the latter can be activated only during the period of the horizontal synchronizing signal, and be inoperative during the remainder of each period. Such an activation sequence is shown in FIG. 7. Similarly, when the recorded signal is a pulse code modulation (PCM) audio signal, the switching or triggering frequency for the tracking control laser can be the sampling frequency of the PCM signal.

As will be obvious to those skilled in the art, it would also be possible to dispose a third collector lens 9 as shown in FIG. 1 between the mirror 4 and the radiation-sensitive detector 20; to dispose the mirror 4 between the lasers 1a, 1b and the first lens 3; to remove the half mirror 4 by disposing the optical detector 20 between the second lens 5 and the disc 6; and to remove the mirror 4 by using lasers which have the ability to detect the quantity of the reflected light, in place of the lasers 1a, 1b.

Although only two lasers providing two optical spots are used in the above described embodiment, the present invention is equally applicable to an apparatus comprising more than two lasers, that is, providing more than two optical spots. Also, the switching over of the optical spots may be carried out by deflecting the axis of the beam, instead of using the on-off operation of the semi-conductor lasers.

As described above, the apparatus according to the present invention can detect two radiation beams with one radiation-sensitive detector because two laser beams are activated alternatively with a time sharing technique.

Accordingly, precise positional adjustment between two radiation-sensitive detectors and the additional lens for focusing two radiation beams to two radiation-sensitive detectors can be eliminated.

What is claimed is:

1. An optical apparatus for tracking a record carrier comprising:
   a first radiation source for generating a first radiation beam applied onto an information track of a record carrier to read out information;
   a second radiation source for generating a second radiation beam applied onto the information track at a predetermined distance from said first radiation beam;
   a first selector for selecting one of said first and second radiation beams to be applied to said record carrier;
   a radiation-sensitive detector for detecting a radiation beam reflected by said record carrier;
   a second selector coupled with said radiation-sensitive detector and operating in synchronysm with said first selector to periodically select the reflected radiation caused by said second radiation beam; and
   shifting means coupled with said second selector for adjusting the position of an optical system comprising said first and second radiation sources in response to an amplitude difference between the output of said second selector and a reference signal level in order to follow said information track.

2. An apparatus as claimed in claim 1 wherein said first selector alternately selects said first radiation beam and said second radiation beam, and wherein the selection frequency is higher than the information frequency recorded on said record carrier.

3. An apparatus as claimed in claim 1 wherein said first radiation beam and said second radiation beam are selected alternately, and wherein the period for selecting said second beam is shorter than the period for selecting said first beam.

4. An apparatus as claimed in claim 3 wherein said second radiation beam is selected during a synchronizing signal period of the recorded information.

5. An apparatus as claimed in claim 4 wherein said first and second radiation beams are laser beams.

6. An apparatus as claimed in claim 5 wherein said record carrier is a disc-shaped record carrier which contains video or audio signals recorded in optical form.

7. In an optical apparatus for tracking a spiral recording groove on a rotating storage disc during readouts, including first and second lasers for generating readout and tracking beams, respectively, electro-optical detector means, optical means for focusing the beams onto the disc at spaced positions, and electro-mechanical transducer means for adjusting the position of the lasers and optical means in response to amplitude differences between an output of the detector means and a reference signal, the improvements characterized by:
   (a) first switching means for selectively energizing either the first or the second laser,
   (b) second switching means for selectively coupling the detector means output to either a readout circuit or to a tracking control circuit, and
   (c) drive circuit means for synchronously controlling the first and second switching means.

* * * * *